Nov. 14, 1944.   O. WITTEL   2,362,603
FOCUSING LENS MOUNT
Filed Aug. 26, 1943
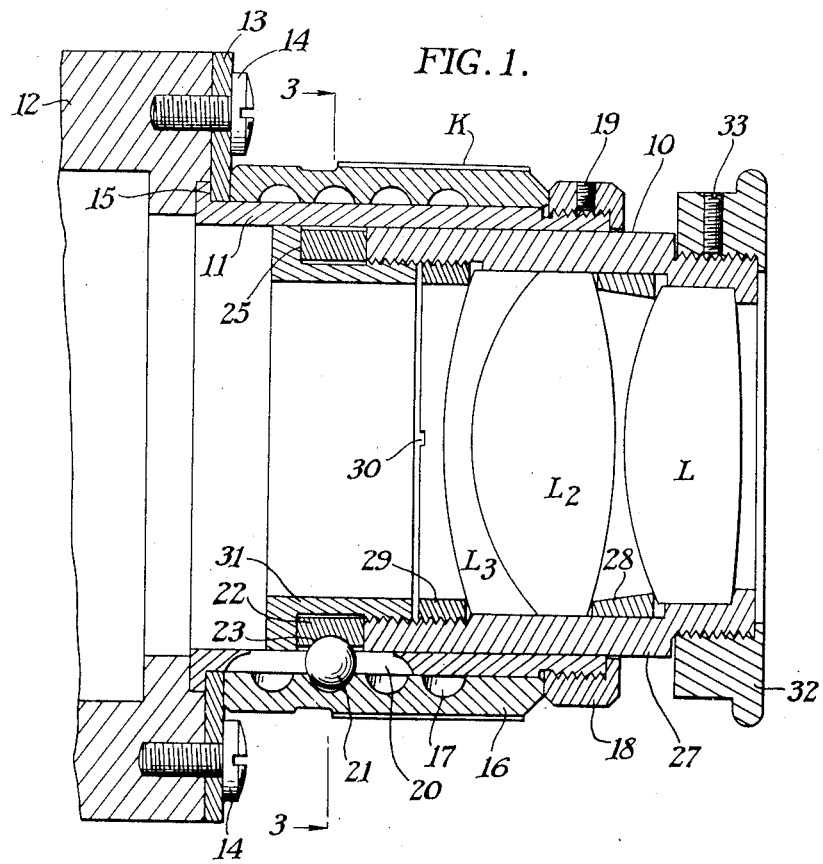
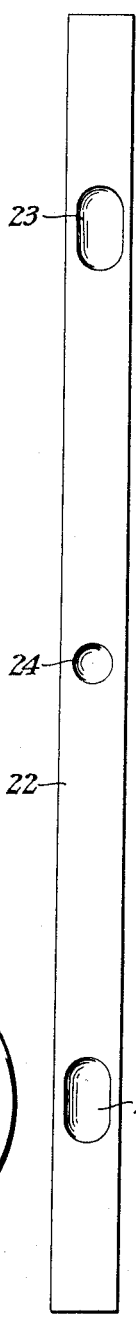
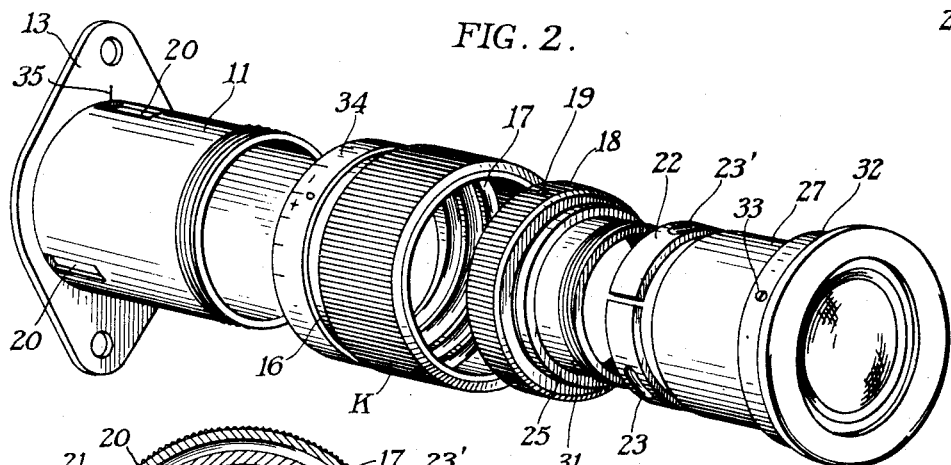
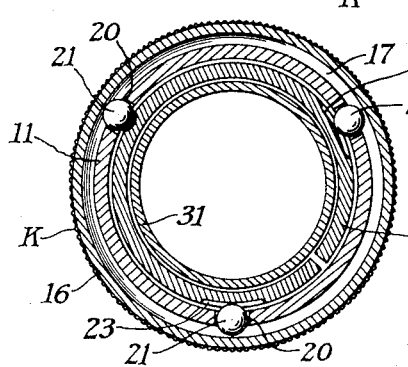
OTTO WITTEL
INVENTOR
BY
ATTORNEYS Patented Nov. 14, 1944

2,362,603

UNITED STATES PATENT OFFICE 2,362,603

FOCUSING LENS MOUNT

Otto Wittel, Rochester, N. Y., assignor to Eastman Kodak Company, Rochester, N. Y., a corporation of New Jersey Application August 26, 1943, Serial No. 500,084

6 Claims. (Cl. 88—57)

The present invention relates to optical instruments, such as telescopes, photographic cameras, picture projection apparatus, etc.; and more particularly to a focusing lens mount therefor.

The objects of the present invention are to provide a focusing lens mount for a telescope, or other optical instrument, which is extremely simple in construction to the end that it is cheap to manufacture and easy to assemble; to provide a mechanism which, despite its simplicity, is smooth and accurate in operation and free from back-lash trouble so prevalent in focusing mechanisms and the attempted elimination of which has proved expensive; to provide a focusing mechanism in which the focusing movement is derived from the engagement between one or more balls with a helical or spiral groove, the balls being normally held in engagement with the groove by an expansion ring which is movable axially of the instrument for focusing purposes and which ring, in combination with the balls, constitutes a movable carriage to which the lens carrying sleeve is detachably connected to be moved therewith and thereby for focusing purposes.

The balls are seated in the expansion ring so that at least one of them, the locating ball, is incapable of movement axially or circumferentially of the ring, and the others are capable of a limited movement circumferentially of the ring to allow the same to normally expand. The balls are preferably of such diameter that they will not fully seat in the helical or spiral groove, but will have substantially a two-point contact with the walls thereof, all for the purpose of preventing back-lash in the threaded engagement provided by the balls and groove, and consequently back-lash, or lost motion, in the focusing movement.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Fig. 1 is a longitudinal sectional view of a focusing lens mount constructed in accordance with a preferred embodiment of the present invention, Fig. 2 is an exploded perspective view showing the individual parts making up the focusing lens mount and the manner of their assembly, Fig. 3 is a transverse section of the mount taken substantially on line 3—3 of Fig. 1, and Fig. 4 is an elevational view of the expansion ring, forming a part of the focusing lens mount, in a flat condition to clearly point out the formation and location of the ball seats therein.

Like reference characters refer to corresponding parts throughout the drawing.

While for the purposes of disclosing my invention I will refer to it as a focusing eye-piece for a telescope, it will be readily understood that it could be just as well used as a focusing lens mount for a camera objective or a lens mount for a picture projection apparatus.

Referring now to the drawing wherein is shown an eye-piece for a telescope incorporating a focusing mechanism constructed in accordance with the preferred embodiment of the present invention, the eye-piece, indicated generally by the numeral 10, includes a tube 11 which supports all of the elements making up this lens mount. The eye-piece as a whole is mounted on the rear end of a telescope tube, indicated at 12, by an attaching plate 13 connected to the end of the instrument by a plurality of bolts 14 and engaging a shoulder 15 on the end of the tube 11. When the eye-piece is mounted on the telescope, the attaching plate 13 is drawn down tight enough to keep the tube 11 from rotating.

Rotatably mounted on the exterior of the tube 11 is the focusing ring 16 which on its inner surface is provided with a spiral cam groove 17 running lengthwise of the ring. The focusing ring is held against movement axially of the tube 11 by a retaining ring 18 threaded onto the forward end of the tube 11 and held in place by a set-screw 19. The retaining ring 18 is drawn down tight enough to prevent any axial movement of the focusing ring, but not tight enough to hamper free rotation of the ring for focusing purposes. The focusing ring may be of a substantial length as shown, and the forward end thereof may be provided with a knurling K to facilitate manipulation of the ring.

The tube 11 is provided with a plurality of elongated slots 20, in this case 3, equidistantly spaced circumferentially of the tube and through each of which extends a ball 21 which is adapted to engage the cam groove 17 in the focusing ring 16. The balls are held in place, and normally forced into the cam groove 17, by a single split expansion ring 22 which is located within the tube 11. This expansion ring is merely a split ring formed from a band of resilient material of the form best shown in Fig. 4. As clearly shown in Figs. 1 and 4, when the expansion ring 22 is engaging the balls, it is spaced from the inner surface of the tube 11 and is free to move axially thereof. I have chosen to show the cam groove 17 as being of a semi-circular contour, although it could just as well be a V-shaped groove; and looking at Fig. 1, it will be noticed that the width of the groove is less than the diameter of the balls so that the balls have a substantially two-point contact with the groove rather than a surface contact. This relationship of parts is all important to the present invention because it lends itself to the elimination of back-lash, or lost motion, in the focusing mechanism which is a condition which is always troublesome in focusing lens mounts and is ofttimes costly to overcome. Since the balls are larger than the cam groove, and are always spring pressed radially thereinto by the expansion ring, there will be no tendency for the balls to move axially relative to the focusing ring when the latter is turned. This is true even after the groove or balls may show some wear due to continued use, because the expansion ring will continually act to force the balls toward the bottom of the groove and thereby automatically account for wear of these two parts.

As clearly shown in Fig. 4, the expansion ring 22 is provided with three ball seats 23, 23' and 24. The two first-mentioned ball seats, 23, and 23', are located adjacent the split in the ring and are elongated circumferentially of the ring, while their width is slightly less than the diameter of the balls for the purpose set forth above in describing the relationship of the width of the cam groove and the diameter of the ball. The two seats 23 and 23' are elongated as shown to permit the expansion ring to contract and expand without disrupting the engagement between the balls and the cam groove. The ball seat 24 which is intermediate the ends of the expansion ring 22 is spherical concave and slightly smaller in diameter than the ball so that there can be no relative movement between the ball and ring axially or circumferentially of the ring. The seat 24 is aptly called the locating seat because it prevents any back-lash whatsoever between the focusing ring 16 and the expansion ring 22. This is not true of the ball seats 23 and 23', because due to their elongation, they would permit the ball seated therein to move along with the focusing ring a short distance as the latter was turned, and which occurrence would introduce a slight back-lash, or lost motion, between the focusing ring 16 and the expansion ring 22.

Considering the parts so far set forth, it will be readily understood that as the focusing ring 16 is rotated, the balls and the expansion ring 22 supported thereby will be moved axially of the tube 11 by virtue of the engagement between the balls and the cam groove, the direction of movement depending, of course, upon the direction of rotation of the focusing ring. The elongated slots 20 in the tube 11 which permit the balls to move axially of the tube are of a length corresponding to the focusing range of the mount. Accordingly, the balls 21 in combination with the expansion ring 22 constitute a carrying mechanism to which the lenses may be connected to be moved for focusing purposes.

According to the present invention, the lens elements L1, L2, and L3 are held in proper spaced relation in a sleeve 27 by retaining members 28 and 29. The latter retaining member may, as shown, comprise a ring threaded into the rear end of the sleeve 27 and be provided with diametrically spaced slots 30 for the reception of a spaner wrench as is well known to those skilled in the art. The lens sleeve 27 is adapted to be telescoped with the tube 11 and abut one edge of the expansion ring 22, see Fig. 1. This sleeve is detachably connected to the expansion ring by clamping ring 31 the forward end of which is adapted to telescope with the expansion ring 22 and is threaded into the rear end of the lens sleeve 27. The clamping ring 31 is tightened down until the expansion ring 22 is firmly held between the rear end of the lens sleeve and a shoulder 26 on the clamping ring, whereafter the lens sleeve is moved back and forth in the tube 11 with and by the expansion ring for focusing purposes. In the present instance, to give the mount a finished appearance, the end of the lens sleeve 27 is threaded to receive an annular cap 32 which may be held in place by a setscrew 33.

As shown, the focus adjustment may be indicated by a focusing scale 34 formed on the rear end of the focusing ring 16 in cooperation with an index mark 35 on the exposed face of the attaching plate 13. This particular arrangement permits the focusing scale to be initially properly set with respect to the index, because, since the attaching plate 13 is freely mounted on the exterior of the tube 11, the tube 11 and the mount as a whole may be rotated relative thereto before the bolts 14 are tightened down, whereby the scale can be adjusted relative to the index mark. While the invention is here disclosed as associated with a telescope and the focusing scale is accordingly shown in units indicative of degrees of focusing movement necessary to adapt the user's eye to the instrument, it will be readily understood that this focusing scale could be marked off in any desirable units, for instance, distances in feet for use in connection with photographic cameras, without going beyond the scope of the present invention.

In addition to this focusing lens mount requiring a minimum number of parts, the design permits the same to be readily assembled and disassembled, a prime factor, not only in the cost of the initial instrument, but also desirable for the purposes of cleaning the lenses. The manner of assembling this focusing lens mount will be described with the aid of Fig. 2, and the ease with which this step is accomplished will be obvious from such description. First, the attaching plate 13 is slipped onto the tube 11 from the front and is pushed up against the shoulder 15 so that it is beyond the elongated slots 20 in the tube. Then one can proceed in one of two ways to mount the balls, focusing ring, and expansion ring in operative relationship. One way, and probably the simplest, is to slip the expansion ring 22 into the rear end of the tube 11 and rotate it relative thereto until the ball seats 23, 23', and 24 therein line up with the elongated slots 20 in the tube 11. Then the balls 21 can be dropped through the elongated slots 20 into their respective seats in the expansion ring, and then the focusing ring 16 is slipped over the tube 11 and turned until the cam groove 17 therein engages the balls in the manner of a threaded engagement. The focusing ring is then turned until it moves back against the attaching plate 13, and the balls will be pressed inwardly to slightly contract the expansion ring so that it will be supported by the balls and normally act to force the same radially into the cam groove. The screwing of the focusing ring onto the ball in the manner set forth is facilitated by dipping the balls in a lubricating grease so that they will tend to stick in place, and by extending the cam groove 17 to the end of the focusing ring to provide a lead thread. A second way would be to slip the focusing ring onto the tube 11 first, and after inserting the balls through the elongated slots 20 from the inside of the tube 11, then contract the expansion ring and slip it inside of, and in engagement with, the balls.

After the focusing ring, balls, and expansion ring are brought into operative relation, the retaining ring may be screwed onto the end of the tube 11 to hold the focusing ring 16 against axial movement. Then, the lens sleeve 27 is inserted in one end of the tube 11 and the clamping ring 31 is inserted into the other end of the tube, and the two are threaded together until the expansion ring is firmly clamped therebetween and accordingly, connected thereto for common movement axially of the tube 11 for focusing purposes.

From the above description it will be readily appreciated that I have invented a focusing lens mount which is not only simple in construction, simple and cheap to manufacture and assemble, but one which is efficient and extremely smooth in operation. I am aware that cooperating ball and spiral groove arrangements have been used in focusing lens mounts heretofore, but I am not aware of a prior art disclosure which shows a combination of parts that I have shown, and claim as new, or a spiral groove and ball arrangement which possesses the operating and assembly advantages inherent in the present arrangement. So far as I know, no prior focusing lens mount using a spiral groove and ball arrangement has moved the balls and the equivalent of the present expansion ring for the focusing movement, and has arranged these parts so that they are connected to move together and constitute a carrying mechanism to which the lens sleeve can be readily detachably connected to be moved therewith and thereby for focusing purposes. In known arrangements, the balls are held stationary, and the member having the cam groove is moved axially. This means that the member rotated for focusing must also move axially for focusing, which is far from desirable because the operator in initiating one movement unconsciously restrains the other.

Furthermore, the present arrangement, and relative sizes, of the balls, cam groove and ball seats in the expansion ring provides a simple and efficient focusing mechanism which is free from back-lash, or lost motion, between the focusing ring and the lens moving mechanism; and which will automatically account for wear in the important moving parts to prevent the ultimate appearance of back-lash due to such wear.

Although I have shown and described certain specific embodiments of my invention, I am fully aware that many modifications thereof are possible. My invention, therefore, is not to be limited to the precise details and construction shown and described, but is intended to cover all modifications coming within the scope of the appended claims.

Having thus described my invention, what I claim as new and desire to secure by Letters Patent of the United States is:

1. A focusing lens mount for an optical instrument comprising in combination a tube member having an axially extending elongated slot in the wall thereof, a focusing ring rotatably mounted in concentric relation with and on the exterior of said tube and normally held against axial movement, a spiral track formed on the inner surface of said ring, a lens carrying mechanism slidably mounted in said tube to move axially thereof for focusing purposes, and including a member extending through said elongated slot and normally held in engagement with said track and held against movement relative to said carrying mechanism axially of the tube, a lens carrying sleeve adapted to telescope with said tube, and means for detachably connecting said sleeve to said carrying mechanism to be moved axially of the tube therewith and thereby for focusing purposes.

2. A focusing lens mount for an optical instrument according to claim 1 and in which the lens carrying mechanism includes a ball extending through said elongated slot, and a resilient member normally forcing the same into engagement with said spiral track.

3. A focusing lens mount for an optical instrument comprising in combination a tube having an elongated slot in the wall thereof and extending longitudinally thereof, a focusing ring rotatably mounted on said tube and normally held against axial movement, the inner surface of said focusing ring provided with a spiral track, a spring ring of substantial width slidably mounted within said tube in concentric relation therewith, the outer face of said ring including a ball seat in alignment with the slot in said tube, and a ball situated in said seat and pressed into engagement with said track by the resiliency of said ring, whereby the ball and ring, in combination, are adapted to be moved axially of said tube by rotation of the focusing ring, a lens carrying sleeve adapted to telescope with said tube, and means for connecting said sleeve to said spring ring to be moved axially of the tube thereby for focusing purposes.

4. A focusing lens mount for an optical instrument comprising in combination a tube having a plurality of axially extending elongated slots in the wall thereof and circumferentially spaced thereof, a focusing ring rotatably mounted in concentric relation with said tube and normally held against axial movement, a spiral track formed on the inner surface of said ring, an expansion ring of substantial width mounted within said tube in concentric relation therewith, the outer surface of said expansion ring provided with a plurality of ball seats corresponding in number, and in alignment with, the slots in said tube, and a ball situated in each of said seats and pressed into engagement with said track by the resiliency of said expansion ring, whereby the balls and ring, in combination, are adapted to be moved axially of said tube by rotation of the focusing ring, a lens carrying sleeve adapted to telescope with said tube, and means for detachably connecting said sleeve to said expansion ring to be moved axially of the tube thereby for focusing purposes.

5. A focusing lens mount for an optical instrument according to claim 4 and in which the spiral track is substantially semi-circular in contour and the maximum width thereof is less than the diameter of the balls, whereby back-lash in the focusing movement of the mechanism is reduced to a minimum.

6. A focusing lens mount for an optical instrument according to claim 4, and in which one of the ball seats in the expansion ring is of such a size as to prevent movement of the ball relative to the expansion ring in any direction to eliminate back lash in the focusing mechanism, and the remaining ball seats are elongated circumferentially of the ring to permit the same to normally expand while engaging the balls.

OTTO WITTEL.